(12) United States Patent
Balasubramanian et al.

(10) Patent No.: US 8,194,617 B2
(45) Date of Patent: Jun. 5, 2012

(54) METHOD AND APPARATUS FOR INCREASING EFFICIENCY OF DATA PACKET TRANSMISSION

(75) Inventors: Srinivasan Balasubramanian, San Diego, CA (US); Vipin A. Sali, San Clemente, CA (US)

(73) Assignee: QUALCOMM Incorporated, San Diego, CA (US)

( * ) Notice: Subject to any disclaimer, the term of this patent is extended or adjusted under 35 U.S.C. 154(b) by 852 days.

(21) Appl. No.: 12/244,983

(22) Filed: Oct. 3, 2008

(65) Prior Publication Data

US 2009/0219891 A1 Sep. 3, 2009

Related U.S. Application Data

(60) Provisional application No. 60/978,061, filed on Oct. 5, 2007.

(51) Int. Cl.
*H04W 4/00* (2009.01)
*H04B 7/185* (2006.01)
(52) U.S. Cl. ........................................ 370/332; 370/316
(58) Field of Classification Search ............... 455/452.2; 370/332
See application file for complete search history.

(56) References Cited

U.S. PATENT DOCUMENTS

| | | | |
|---|---|---|---|
| 2004/0081111 A1* | 4/2004 | Bae et al. | 370/316 |
| 2006/0205415 A1* | 9/2006 | Rezaiifar et al. | 455/452.2 |
| 2007/0066232 A1 | 3/2007 | Black | |
| 2008/0214201 A1* | 9/2008 | Fang et al. | 455/452.2 |

FOREIGN PATENT DOCUMENTS

| | | |
|---|---|---|
| GB | 2318256 | 4/1998 |
| WO | WO0171521 A1 | 9/2001 |
| WO | WO2006096764 A2 | 9/2006 |

OTHER PUBLICATIONS

International Search Report & Written Opinion—PCT/US2008/079000, International Searching Authority—European Patent Office—Feb. 23, 2009.

* cited by examiner

*Primary Examiner* — Jeffrey Pwu
*Assistant Examiner* — Majid Esmaelian
(74) *Attorney, Agent, or Firm* — Darren M. Simon

(57) ABSTRACT

An apparatus and method for increasing efficiency of data packet transmission comprising receiving a TCA message and a new pilot signal; determining if the TCA message includes at least one scheduler tag; performing one of the following: determining if there are other pilot signals associated with the at least one scheduler tag or determining if the new pilot signal is in a softer handoff with a member of an active set; and performing one of the following: associating the new pilot signal to the at least one scheduler tag or creating a new scheduler group and associating the new pilot signal with it. In one aspect, one of the following additional steps is performed: determining if all the other pilot signals are newly added to the at least one scheduler tag or determining if at least one of the other pilot signals is associated with the active set.

20 Claims, 6 Drawing Sheets

METHOD AND APPARATUS FOR INCREASING EFFICIENCY OF DATA PACKET TRANSMISSION

CLAIM OF PRIORITY UNDER 35 U.S.C. §119

The present Application for patent claims priority to Provisional Application No. 60/978,061 entitled "Scheduling Method and Apparatus" filed Oct. 5, 2007, and assigned to the assignee hereof and hereby expressly incorporated by reference herein.

FIELD

This disclosure relates generally to communication between devices. More particularly, the disclosure relates to a method and apparatus for increasing the efficiency of data packet transmission.

BACKGROUND

Wireless communications systems are widely used to enable mobile connectivity. That is, users may employ wireless devices to access various communication networks while on the move, either in a vehicle or on foot. There are many wireless access technologies, such as frequency division multiple access (FDMA), time division multiple access (TDMA), and code division multiple access (CDMA) that may be used to enable simultaneous wireless connectivity within a shared frequency band.

In one example, a wireless device employed by a mobile user is known as an access terminal (AT). The AT facilitates communication with other users through a wireless access technology to an access network (AN). In general, the AN is in turn connected to other communication networks, such as the Public Switched Telephony Network (PSTN), a Public Switched Data Network (PSDN), the Internet, private networks, etc. For example, the AN serves as the portal to other networks for the mobile user. In one example, the mobile user connects to a telephone call via the PSTN. In another example, the mobile user connects to Internet service providers, computer databases, data servers, etc. via the Internet. The wireless access communication link from the AN to the AT is known as a forward link. In the opposite direction, the wireless access communication link from the AT to the AN is known as a reverse link. In one example, the AN includes pilot signals within the forward link. Pilot signals are known reference signals (without user traffic) sent by a transmitter to assist the receiver in acquiring, tracking, and communicating on a link. For example, the pilot signals sent by a transmitter may be used by the receiver for channel estimation, time synchronization, frequency referencing, phase referencing, code referencing, etc. The receiver may receive the pilot signals and, for example, measure its signal strength to estimate the propagation channel characteristics over the receive frequency band. Such information may be used, for example, in equalizing the propagation channel characteristics to improve overall performance.

For certain wireless access technologies, a set of pilot signals is affiliated within a scheduler group. In addition, an instance of the Quick NAK (QN) protocol, which is part of the radio link layer, is associated with the scheduler group. A new QN instance is created whenever a new scheduler group appears or is created. In the example when all existing active set members of a given scheduler group are deleted from the scheduler group and disjoint pilot signals from the same scheduler group are assigned to an AT, the AT will create a new scheduler group and hence a new QN instance. On the other hand, the AN will typically in this case continue to use the same QN instance. Consequently, there's a mismatch between the QN instance of the AT (which is new) and the QN instance of the AN (which is old). Thus, the first data packet received over the QN instance (i.e., new at the AT and old at the AN) will cause the generation of a negative acknowledgement (NAK) message from the AT with the leading edge not set and indicating the trailing edge. The NAK message will result in the AN requiring a retransmission of the data packet for up to the NAK Abort interval time period.

SUMMARY

Disclosed is an apparatus and method for increasing efficiency of data packet transmission. According to one aspect, a method for increasing efficiency of data packet transmission comprising receiving a TCA message and a new pilot signal; determining if the TCA message includes at least one scheduler tag; performing at least one of the following steps: determining if there are other pilot signals associated with the at least one scheduler tag or determining if the new pilot signal is in a softer handoff with a member of an active set; and performing at least one of the following steps: associating the new pilot signal to the at least one scheduler tag or creating a new scheduler group and associating the new pilot signal with the new scheduler group. In one aspect, the method further comprises performing at least one of the following steps: determining if all the other pilot signals are newly added to the at least one scheduler tag or determining if at least one of the other pilot signals is associated with the active set.

According to another aspect, an access terminal comprising a processor and a memory, the memory containing program code executable by the processor for performing the following: receiving a TCA message and a new pilot signal; determining if the TCA message includes at least one scheduler tag; performing at least one of the following steps: determining if there are other pilot signals associated with the at least one scheduler tag or determining if the new pilot signal is in a softer handoff with a member of an active set; and performing at least one of the following steps: associating the new pilot signal to the at least one scheduler tag or creating a new scheduler group and associating the new pilot signal with the new scheduler group.

According to another aspect, an access terminal for increasing efficiency of data packet transmission comprising means for receiving a TCA message and a new pilot signal; means for determining if the TCA message includes at least one scheduler tag; means for performing at least one of the following steps: determining if there are other pilot signals associated with the at least one scheduler tag or determining if the new pilot signal is in a softer handoff with a member of an active set; and means for performing at least one of the following steps: associating the new pilot signal to the at least one scheduler tag or creating a new scheduler group and associating the new pilot signal with the new scheduler group.

According to another aspect, a computer program product, comprising a computer-readable medium including program codes stored thereon, comprising program codes for causing a computer to receive a TCA message and a new pilot signal; program codes for causing the computer to determine if the TCA message includes at least one scheduler tag; program codes for causing the computer to perform at least one of the following steps: determining if there are other pilot signals associated with the at least one scheduler tag or determining if the new pilot signal is in a softer handoff with a member of an active set; and program codes for causing the computer to perform at least one of the following steps: associating the new pilot signal to the at least one scheduler tag or creating a new scheduler group and associating the new pilot signal with the new scheduler group.

Advantages of the present disclosure include increase efficiency of data packet transmission by avoiding retransmission of the data packets by creating and maintaining QN instances based on scheduler group information received from an access network (AN) through the traffic channel assignment (TCA). In particular, reduction of retransmission is achieved without changes to the implementation of the access terminal (AT).

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
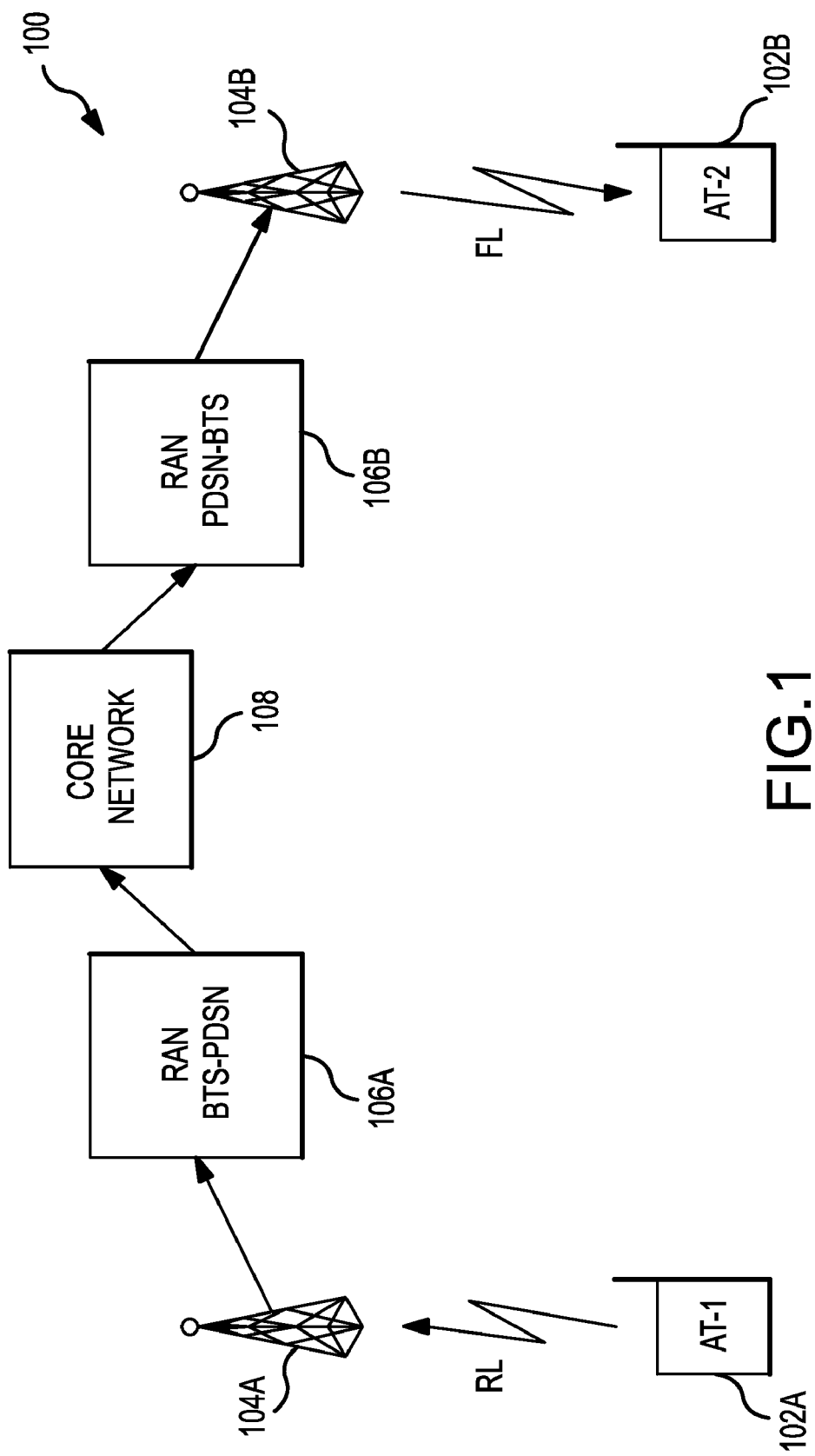
FIG. 1 illustrates an example block diagram of a communication system.

FIG. 1 illustrates an example block diagram of a communication system 100. As shown in FIG. 1, a first access terminal (AT-1) 102A communicates wirelessly in a reverse link (RL) with a base station 104A and a base station transceiver system/packet data serving node (BTS-PDSN) 106A that reside in a radio access network (RAN). The BTS-PDSN 106A communicates with a packet data serving node/base station transceiver system (PDSN-BTS) 106B that resides also in another RAN via a core network 108. As shown in FIG. 1, PDSN-BTS 106B communicates with base station 104B which then communicates wirelessly via a forward link (FL) with a second access terminal (AT-2) 102B. In one aspect, a first access node (AN) includes the base station 104A and the BTS-PDSN 106A. In one aspect, a second access node (AN) includes the base station 104B and the BTS-PDSN 106B.

Each access terminal (AT) 102 may communicate with the core network 108 using one or more channels at different frequencies on a forward link (FL) and/or a reverse link (RL) at any point. There may be any number of channels and/or frequencies allocated on either the forward link or the reverse link. The number of frequency allocation on the forward link need not be the same as the number of frequency allocation on the reverse link.

In one aspect, the reverse link and/or the forward link uses one or more communication protocols, such as Code Division Multiple Access (CDMA) 1×, CDMA 1× EV-DO (Evolution Data Optimized), Wideband CDMA (WCDMA), Time Division Synchronized (TD-SCDMA), Global System for Mobile communications (GSM), OFDM (Orthogonal Frequency Division Multiplexing), systems supporting IEEE standards, such as 802.11 (A, B, G), 802.16, etc. One skilled in the art would understand that the communication protocols listed herein are examples and that other communication protocols may be used without affecting the spirit or scope of the present disclosure.

Examples of an access terminal (AT) include a wired phone, a wireless phone, a cellular phone, a laptop computer, a wireless communication personal computer (PC) card, a personal digital assistant (PDA), an external or internal modem, etc. In one example, an access terminal (AT) can include any data device that communicates through a wireless channel or through a wired channel, for example using fiber optic or coaxial cables. One skilled in the art would understand that the examples of access terminals listed herein are not exclusive and that other examples of access terminals may be used without affecting the scope or spirit of the present disclosure.

In addition, an access terminal may be referred to by various other names, such as access unit, subscriber unit, mobile station, mobile device, mobile unit, mobile phone, mobile, remote station, remote terminal, remote unit, user device, user equipment, handheld device, etc. Access terminals communicate with one or more base station transceiver systems (BTSs), which may be called (or include) base stations, access networks, access points, Node Bs, or modem pool transceivers (MPTs), etc.

Figure 2:
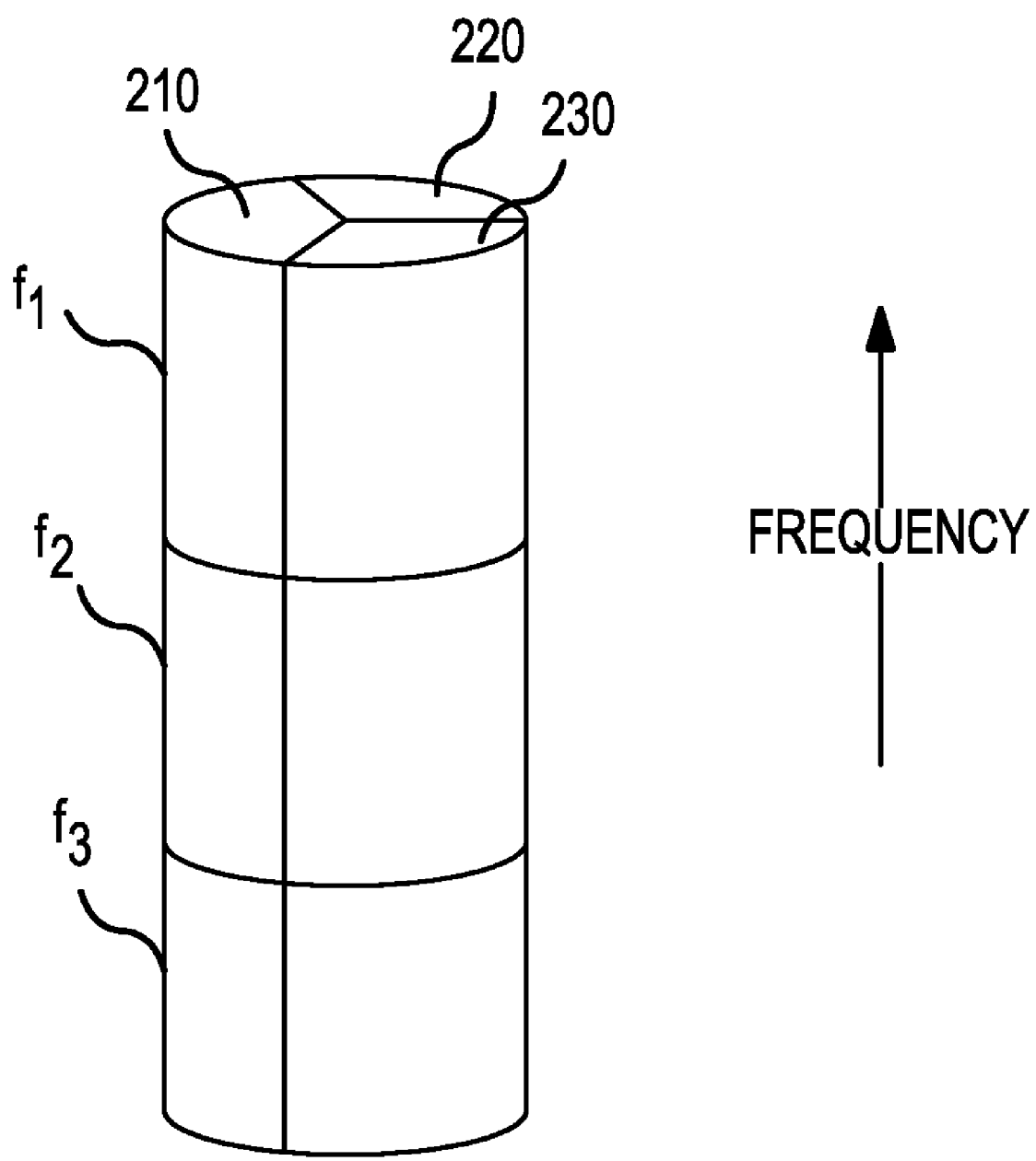
FIG. 2 illustrates an example of a cell in a multi-carrier communication system.

A cell is a coverage area serviced by an access network (AN). A cell may be divided into one or more sectors. FIG. 2 illustrates an example of a cell 200 in a multi-carrier communication system. As illustrated in FIG. 2, the cell 200 is divided into three sectors 210, 220, 230. One or more frequencies may be assigned to cover a cell. In the example illustrated in FIG. 2, three frequencies $f_1, f_2, f_3$ are assigned to cover cell 200.

In a single-carrier communication system, an AT is required to report the strengths of all the pilot signals received, as the pilot signals become strong or weak in strength. In a multi-carrier communication system, multiple pilot signals may be associated with a sector such as that shown in FIG. 2. An AT may report the strength of each pilot signal received. In one example, a route update message triggers a pilot strength report. A route update message is used by the AT to send information relating to the pilot signals to the AN.

In one aspect, an AT may be served by any of the pilot signals in its active set. The active set specifies the set of ANs with sufficiently good signal quality for that AT. In one aspect, the active set comprises different scheduler groups. In one example, two pilot signals are defined to belong to the same scheduler group if the two pilot signals are in the same CDMA channel and they both belong to sectors that are in softer handoff with each other (as identified, for example, in a traffic channel assignment (TCA) message). In another example, two pilot signals are defined to belong to the same scheduler group if the two pilot signals have the same scheduler tag. In one aspect, the TCA message is provided to an AT to allocate an active set to the AT. As the AT moves within the coverage area, the network provides an updated set of pilot signals and the active set to the AT.

Figure 3:
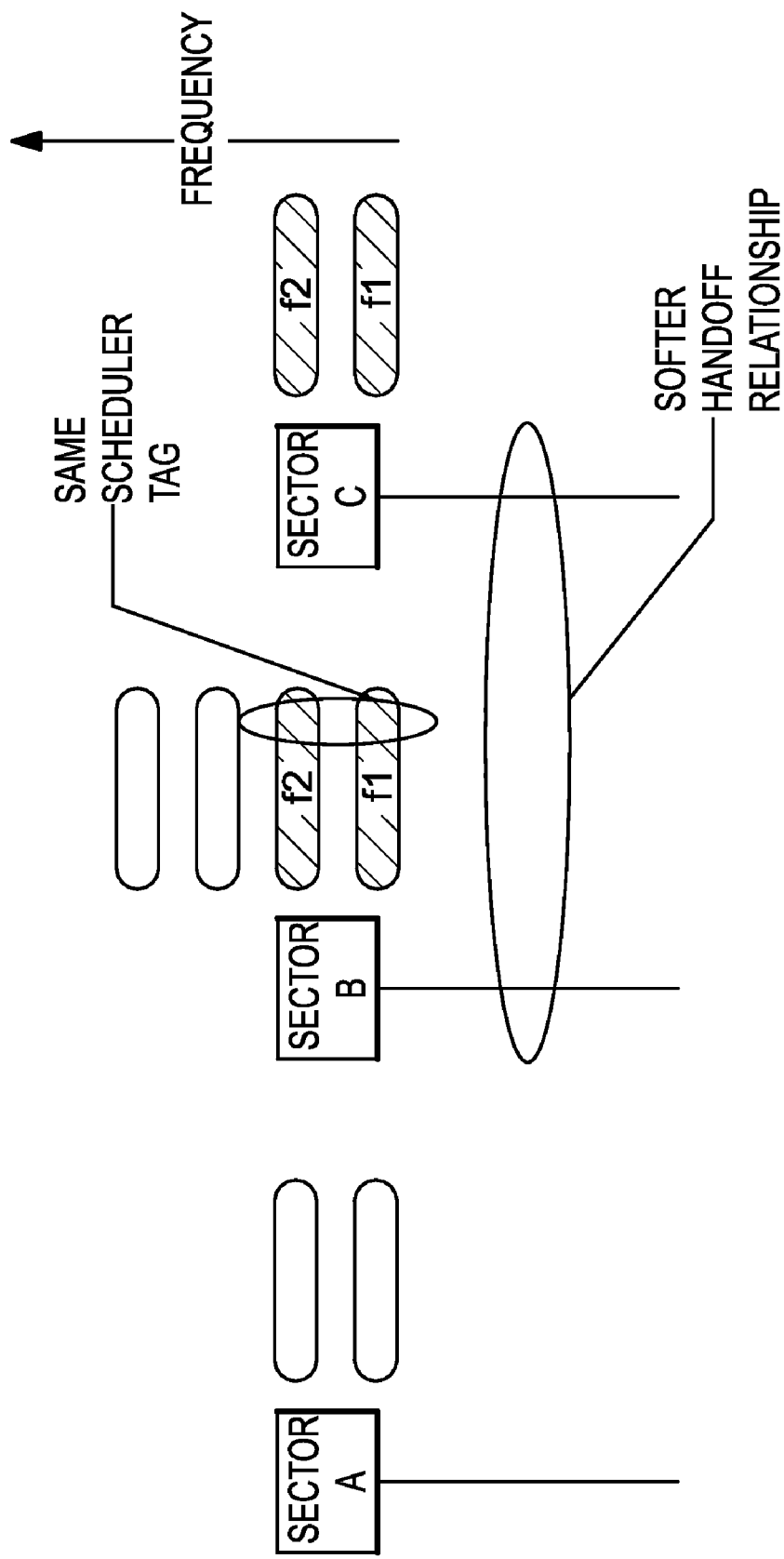
FIG. 3 illustrates an example of a scheduler group.

FIG. 3 illustrates an example of a scheduler group. If two pilots belong to the same scheduler group, they share the same QN sequence space in a multi-link radio link protocol (RLP). A RLP is a class of error control protocols known as NAK-based automatic repeat request (ARQ) protocols used in wireless air interface. An ARQ protocol is used to determine the appropriate circumstances to request for retransmission of a data packet if, for example, a data packet is lost or received in error. In one example, the RLP protocol comprises a segmentation and reassembly layer (SAR) and a Quick NAK (QN) layer. SAR refers to a process used to fragment and reassemble packets so as to allow them to be transported across a network. In one aspect, the scheduler group is designated by QN instances (a.k.a. scheduler tags). Thus an active set may comprise f1 <PN1, PN2> designated as scheduler group QN1 and f1<PN4, PN5> designated as scheduler group QN2. This active set may also be represented as (Pilot PN, Scheduler Tag)={(PN1, 1), (PN2, 1), (PN4, 2), (PN5, 2)}.

In one example, all existing active set members of a given scheduler group are deleted and disjoint pilot signals from the same scheduler group are assigned to the AT. In this example, the AT creates a new scheduler group and hence a new QN instance (i.e., a new scheduler tag). The AN, on the other hand, may continue to use the same QN instance or the same scheduler group. For instance, suppose PN1, PN2, and PN3 belong to the same scheduler group, QN1. Suppose further, that in a single traffic channel assignment (TCA), PN3 is assigned while PN1 and PN2 are dropped. An AT without association information (i.e., without knowledge that PN1, PN2, and PN3 belong to the same group), will create a new QN instance upon the traffic channel assignment (TCA), while the AN continues to use the same scheduler group for PN3. In this example, the first data packet received over the QN instance (which is new at the AT but old at the AN), will cause the generation of a negative acknowledgement (NAK) message from the AT with the leading edge sequence number not set and indicating the trailing edge. The leading edge sequence number specifies to the receiving device the quantity of data packets that should have been received. The trailing edge is the oldest data packet that can be requested for retransmission. The AT sends the negative acknowledgement (NAK) message because of the resulting ambiguity. In the example, the AT creates a new QN instance (e.g., with sequence number starting at '1'), while the AN's QN instance sequence number continued with the previous values, resulting in an ambiguity. The NAK message will result in the AN requiring a retransmission of the data packet for up to the NAK Abort interval time period. Retransmission results in inefficiency.

Retransmission of the data packets can be avoided by the creation and maintenance of scheduler tags (i.e., QN instances) based on scheduler group information received from the AN through a traffic channel assignment (TCA) message. Scheduler tags are used to identify the set of pilot signals within the same scheduler group. When scheduler tags are included, the scheduler groups are explicitly defined (within and across carriers). When scheduler tags are not included, the AT assumes all softer sectors to belong to the same scheduler group. In one aspect, the AT is in a valid session with the AN, and the AT follows the requirements set forth in the 1×EVDO Rev. B standard. In another aspect, the AT follows the standards for high speed downlink packet access/high speed uplink packet access (HSDPA/HSUPA) for multicarriers or for OFDM systems with multiple links. In general, the AT operates within any multicarrier system.

Figure 4:
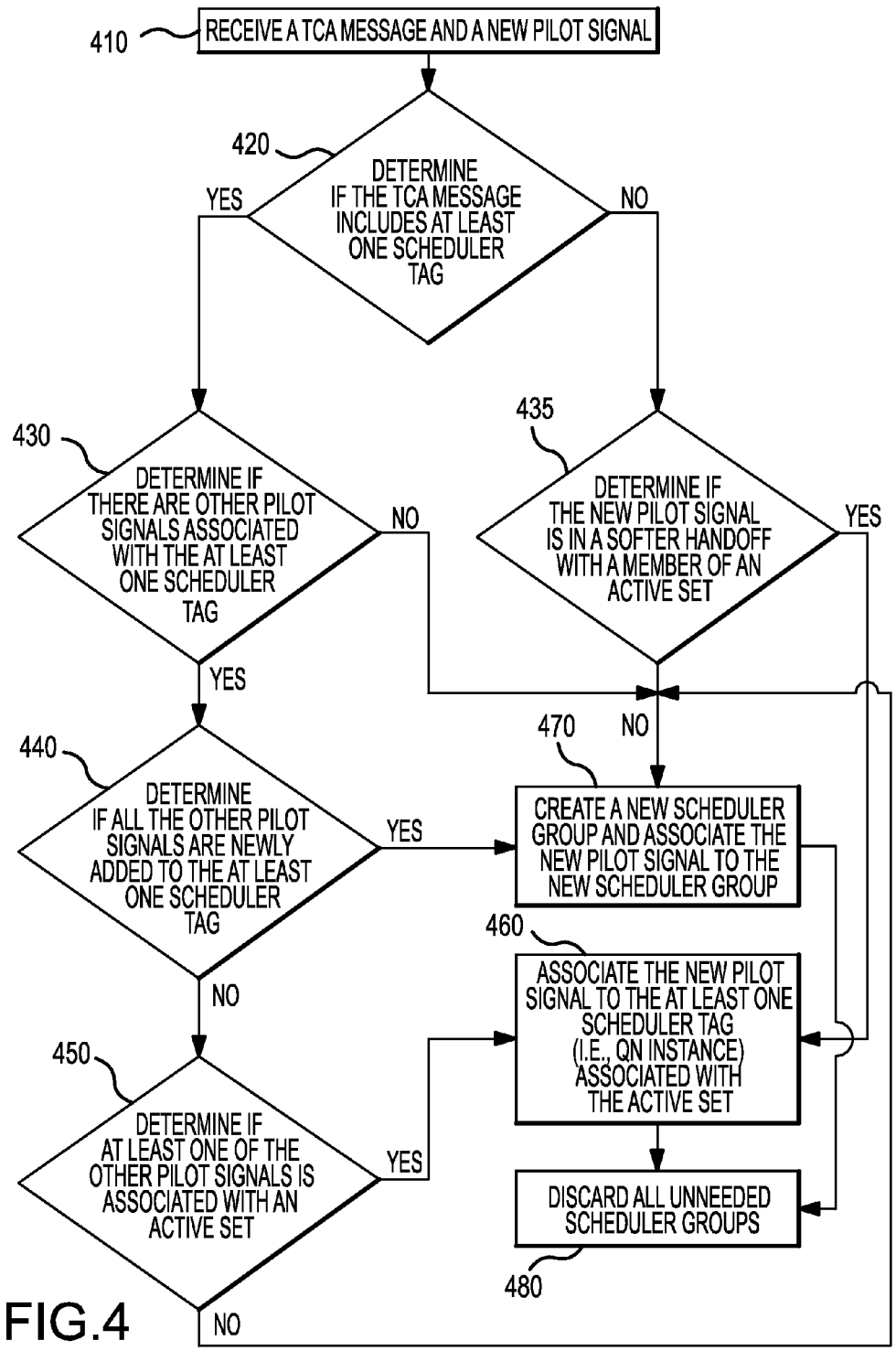
FIG. 4 illustrates an example flow diagram for increasing efficiency of data packet transmission.

FIG. 4 illustrates an example flow diagram for increasing efficiency of data packet transmission. In block 410, receive a TCA message and a new pilot signal. The TCA message provides the active set pilot signals and also identifies the pilot signals that belong to the different scheduler groups. A scheduler group identifies a set of pilot signals that use a common scheduler at the base station transceiver system (BTS). A given common scheduler can be restricted to a single carrier or can span carriers—which depends on the BTS configuration and if a single common scheduler can be used to schedule packets across multiple carriers. Note that the same scheduler tags need not be used to identify grouping of pilot signals that belong to the same scheduler group across multiple TCA messages. The scheduler tag identifier applies only in the context of each TCA message being received and should be carried over to the subsequent TCA messages received.

Following block 410, in block 420, determine if the TCA message includes at least one scheduler tag. If the TCA message includes at least one scheduler tag, in block 430 determine if there are other pilot signals associated with the at least one scheduler tag. If there are no other pilot signals associated with the at least one scheduler tag, proceed to block 470. If there are other pilot signals associated with the at least one scheduler tag, proceed to block 440. In block 440, determine if all the other pilot signals are newly added to the at least one scheduler tag. If all the other pilot signals are newly added to the at least one scheduler tag, proceed to block 470. If not all the other pilot signals are newly added to the at least one scheduler tag, proceed to block 450. In block 450, determine if at least one of the other pilot signals is associated with an active set. If at least one of the other pilot signals is part of an active set, proceed to block 460. In block 460, associate the new pilot signal to the at least one scheduler tag (i.e., QN instance) associated with the active set. If in block 450, none of the other pilot signals is associated with an active set, proceed to block 470.

Following block 420, if the TCA message does not include at least one scheduler tag, proceed to block 435. In block 435, determine if the new pilot signal is in a softer handoff with a member of the active set. If the new pilot signal is in a softer handoff with a member of the active set, proceed to block 460. If the new pilot signal is not in a softer handoff with a member of the active set, proceed to block 470. In block 470, create a new scheduler group and associate the new pilot signal to the new scheduler group. Following blocks 460 and 470, proceed to block 480. In block 480, discard all unneeded scheduler groups.

Whether or not the TCA message includes scheduler tags, in one example, all the pilot signals of a scheduler group in the active set are discarded, and any new pilot signals that belong to the same scheduler group are added in the TCA message and sent to the AT. For example: Current Active Set (Pilot PN, Scheduler Tag)={(PN1, 1), (PN2, 1), (PN4, 2), (PN5, 2), (PN8, 3)}. New Active Set (Pilot PN, Scheduler Tag)={(PN3, 1), (PN4, 2), (PN5, 2), (PN8, 3)}. In this example, two approaches are illustrated to handle this situation. In a first approach, the AT creates a new scheduler tag (i.e., QN instance) associated with the new pilot signal and removes the scheduler tag associated with the discarded pilot signals. In one example, even though PN1, PN2, and PN3 belong to the same scheduler group, since PN1 and PN2 are dropped from the active set prior to adding PN3, the AT creates another scheduler tag instead of reusing the scheduler tag created to support PN1 and PN2 before. The AT does not reuse the scheduler tag and will create a new scheduler tag under these conditions. The same applies when explicit scheduler tags are not included and scheduler groups are indicated implicitly through softer handoff members. If the first approach discussed above is not supported, in a second approach, the AT prevents such an event (i.e., prevents discarding all the pilot signals of a scheduler group in the active set) from occurring by managing the active set assignment accordingly.

If in a situation where neither the first approach nor the second approach are used, when a first data packet is received on the QN instance, the AT will generate a Multi-Link negative acknowledgement (NAK) message with the leading edge not included, trailing edge included, and DelayedNak indicator (i.e., a delayed indicator of a NAK message) not set. The AN in response will then retransmit the packets that were sent over that QN instance between the 'current time' and the 'current time minus the abort time interval'. Retransmission would increase inefficiency. The AT creates the required QN instances, associates the pilot signals with existing or newly created QN instance, and removes the unneeded QN instances depending upon the approach taken. In one aspect, the AT indicates to a multi-link multi-flow packet application (MMPA) when a newly added pilot signal is not part of an existing scheduler group. In one aspect, multi-link refers to multiple carriers and multi-flow refers to different quality of service (QoS) flows and best-effort flows created with a packet application.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

Figure 5:
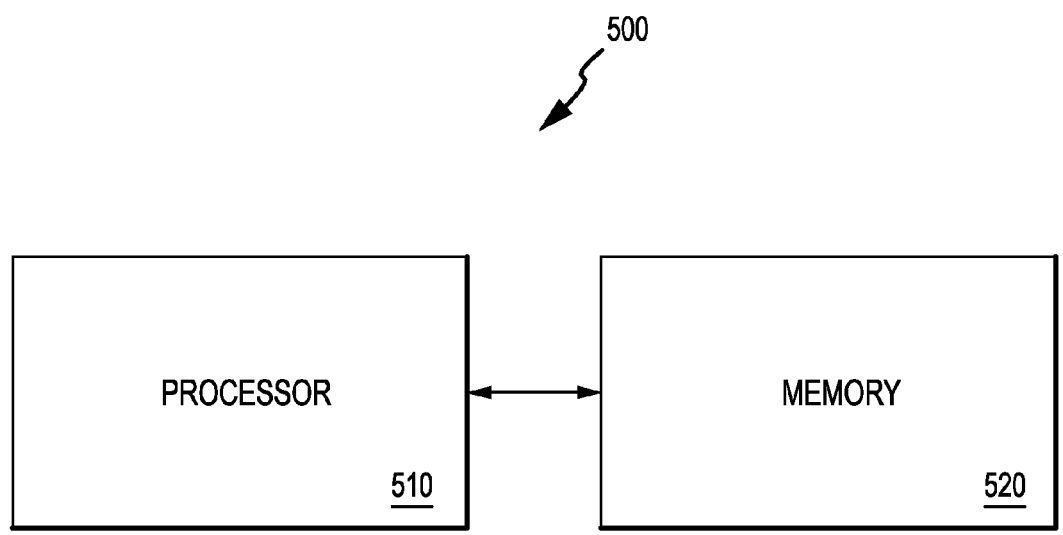
FIG. 5 illustrates an example of a device comprising a processor in communication with a memory for executing the processes for increasing efficiency of data packet transmission.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 5 illustrates an example of a device 500 comprising a processor 510 in communication with a memory 520 for executing the processes for increasing efficiency of data packet transmission. In one example, the device 500 is used to implement the algorithm illustrated in FIG. 4. In one aspect, the memory 520 is located within the processor 510. In another aspect, the memory 520 is external to the processor 510.

Figure 6:
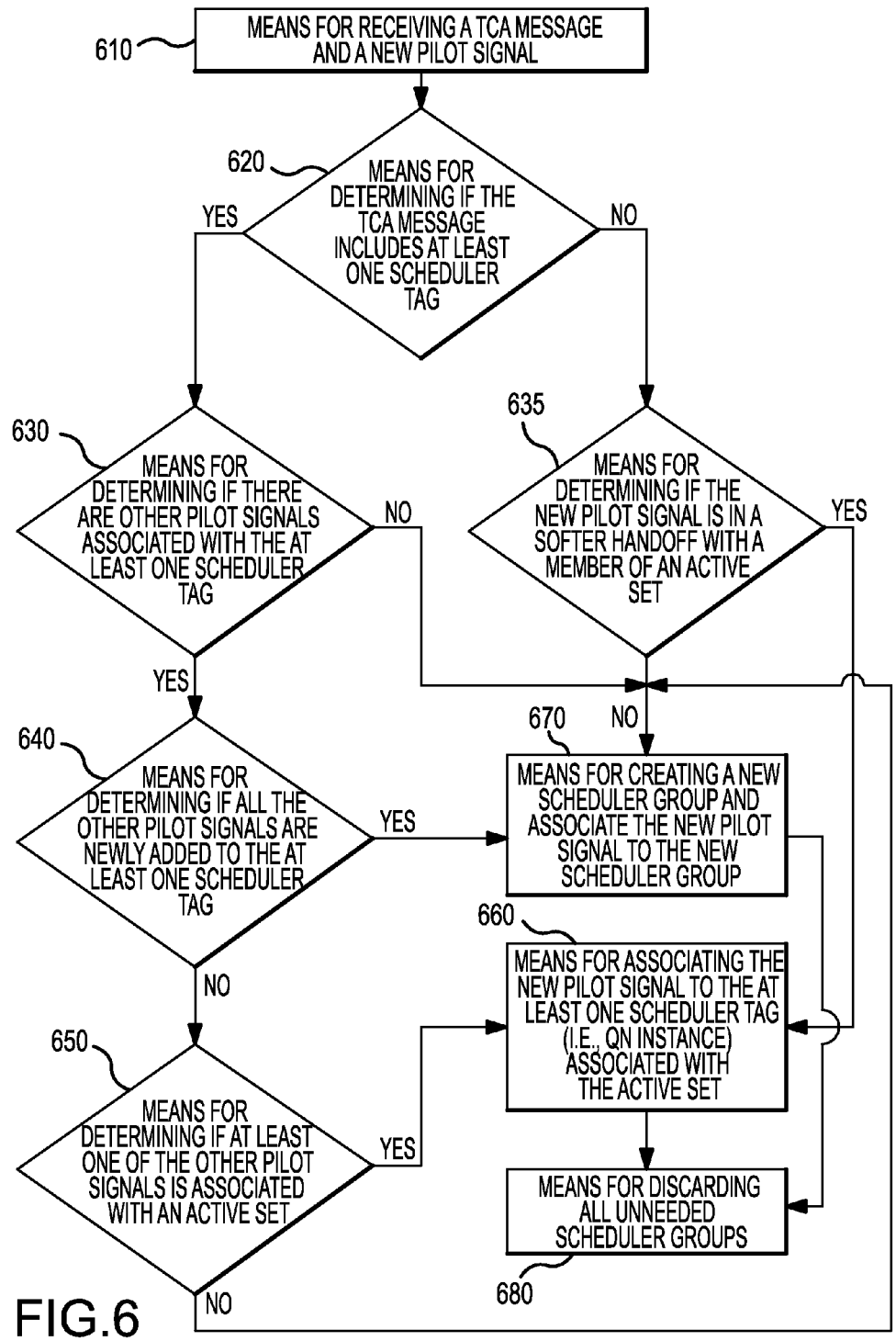
FIG. 6 illustrates an example of a device suitable for increasing efficiency of data packet transmission.

FIG. 6 illustrates an example of a device 600 suitable for increasing efficiency of data packet transmission. In one aspect, the device 600 is implemented by at least one processor comprising one or more modules configured to provide different aspects of increasing efficiency of data packet transmission as described herein in blocks 610, 620, 630, 635, 640, 650, 660, 670 and 680. For example, each module comprises hardware, firmware, software, or any combination thereof. In one aspect, the device 600 is also implemented by at least one memory in communication with the at least one processor.

One skilled in the art would understand that the steps as disclosed in FIGS. 4 and 6 can be interchanged without departing from the scope or spirit of the present disclosure. Furthermore, one skilled in the art would understand that the steps illustrated in FIGS. 4 and 6 are not exclusive, that the steps may be modified according to application or system parameters, and that other steps may be included without affecting the scope or spirit of the present disclosure.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for increasing efficiency of data packet transmission comprising:
    receiving a Traffic Channel Assignment TCA) message and a new pilot signal;
    determining if the TCA message includes at least one scheduler tag, wherein each scheduler tag identifies a corresponding scheduling group including multiple pilot signals, and each pilot signal in each scheduling group shares a Quick NAK sequence space;
    performing at least one of the following steps a or b:
        a) determining if there are other pilot signals associated with the at least one scheduler tag or
        b) determining if the new pilot signal is in a softer handoff with a member of an active set;
    and performing at least one of the following steps c or d:
        c) associating the new pilot signal to the at least one scheduler tag or d) creating a new scheduler group and associating the new pilot signal with the new scheduler group.

2. The method of claim 1 further comprising performing at least one of the following steps:
   determining if all the other pilot signals are newly added to the at least one scheduler tag; or
   determining if at least one of the other pilot signals is associated with the active set.

3. The method of claim 2 further comprising discarding unneeded scheduler groups.

4. An access terminal comprising a processor and a memory, the memory containing program code executable by the processor for performing the following:
   receiving a Traffic Channel Assignment (TCA) message and a new pilot signal;
   determining if the TCA message includes at least one scheduler tag, wherein each scheduler tag identifies a corresponding scheduling group including multiple pilot signals, and each pilot signal in each scheduling group shares a Quick NAK sequence space;
   performing at least one of the following steps a or b:
      a) determining if there are other pilot signals associated with the at least one scheduler tag or
      b) determining if the new pilot signal is in a softer handoff with a member of an active set;
   and performing at least one of the following steps c or d:
      c) associating the new pilot signal to the at least one scheduler tag or
      d) creating a new scheduler group and associating the new pilot signal with the new scheduler group.

5. The access terminal of claim 4 wherein the memory further comprising program code for performing at least one of the following steps:
   determining if all the other pilot signals are newly added to the at least one scheduler tag or
   determining if at least one of the other pilot signals is associated with the active set.

6. The access terminal of claim 5 further comprising discarding unneeded scheduler groups.

7. The access terminal of claim 5 wherein the access terminal is in a valid session with at least one access network.

8. The access terminal of claim 5 wherein the access terminal follows the requirements set forth in the 1×EVDO Rev. B standard.

9. The access terminal of claim 4 wherein the access terminal is one of a wired phone, a wireless phone, a cellular phone, a laptop computer, a wireless communication personal computer (PC) card, a personal digital assistant (PDA), an external modem or an internal modem.

10. An access terminal for increasing efficiency of data packet transmission, comprising:
    means for receiving a Traffic Channel Assignment (TCA) message and a new pilot signal;
    means for determining if the TCA message includes at least one scheduler tag, wherein each scheduler tag identifies a corresponding scheduling group including multiple pilot signals, and each pilot signal in each scheduling group shares a Quick NAK sequence space;
    means for performing at least one of the following steps a or b:
       a) determining if there are other pilot signals associated with the at least one scheduler tag or
       b) determining if the new pilot signal is in a softer handoff with a member of an active set;
    and means for performing at least one of the following steps c or d:
       c) associating the new pilot signal to the at least one scheduler tag or
       d) creating a new scheduler group and associating the new pilot signal with the new scheduler group.

11. The access terminal of claim 10 further comprising means for performing at least one of the following steps:
    determining if all the other pilot signals are newly added to the at least one scheduler tag or
    determining if at least one of the other pilot signals is associated with the active set.

12. The access terminal of claim 11 further comprising means for discarding unneeded scheduler groups.

13. The access terminal of claim 11 wherein the access terminal is in a valid session with at least one access network.

14. The access terminal of claim 11 wherein the access terminal follows the requirements set forth in the 1×EVDO Rev. B standard.

15. A computer program recorded on a non-transitory computer-readable medium and executable on a computer, comprising:
    at least one instruction for receiving a Traffic Channel Assignment (TCA) message and a new pilot signal;
    at least one instruction for determining if the TCA message includes at least one scheduler tag, wherein each scheduler tag identifies a corresponding scheduling group including multiple pilot signals, and each pilot signal in each scheduling group shares a Quick NAK sequence space;
    at least one instruction for performing at least one of the following steps a or b:
       a) determining if there are other pilot signals associated with the at least one scheduler tag or
       b) determining if the new pilot signal is in a softer handoff with a member of an active set;
    and at least one instruction for performing at least one of the following steps c or d:
       c) associating the new pilot signal to the at least one scheduler tag or
       d) creating a new scheduler group and associating the new pilot signal with the new scheduler group.

16. The computer program of claim 15 further comprising at least one instruction for:
    determining if all the other pilot signals are newly added to the at least one scheduler tag or
    determining if at least one of the other pilot signals is associated with the active set.

17. The computer program of claim 15 further comprising at least one instruction for discarding unneeded scheduler groups.

18. The method of claim 1, wherein pilot signals belong to a same scheduler group when the pilot signals are in a same channel and belong to sectors that are in softer handoff with one another, or when the pilot signals have the same scheduler tag, and wherein performing step c or step d is further based on determining whether the new pilot signal is in the same scheduler group as the other pilot signals or the member of the active set.

19. The method of claim 1, further comprising adding the new pilot signal to the active set.

20. The method of claim 1, wherein the at least one scheduler tag corresponds to the new pilot signal.

* * * * *